March 16, 1965     R. S. WOOLLETT     3,174,130
MAGNETOSTRICTIVE FLEXURAL-MODE ELECTROMECHANICAL TRANSDUCER
Filed May 27, 1960     6 Sheets-Sheet 1

INVENTOR.
RALPH S. WOOLLETT

March 16, 1965    R. S. WOOLLETT    3,174,130
MAGNETOSTRICTIVE FLEXURAL-MODE ELECTROMECHANICAL TRANSDUCER
Filed May 27, 1960    6 Sheets-Sheet 2

INVENTOR.
RALPH S. WOOLLETT
BY
ATTORNEY

AGENT

March 16, 1965 R. S. WOOLLETT 3,174,130
MAGNETOSTRICTIVE FLEXURAL-MODE ELECTROMECHANICAL TRANSDUCER
Filed May 27, 1960 6 Sheets-Sheet 4

INVENTOR
RALPH S. WOOLLETT
BY Max A. Farmer
ATTORNEY
Arthur L. Bowers
AGENT

March 16, 1965    R. S. WOOLLETT    3,174,130
MAGNETOSTRICTIVE FLEXURAL-MODE ELECTROMECHANICAL TRANSDUCER
Filed May 27, 1960    6 Sheets-Sheet 6

Fig. 15.

INVENTOR
RALPH S. WOOLLETT
ATTORNEY
AGENT

United States Patent Office 3,174,130
Patented Mar. 16, 1965

3,174,130
MAGNETOSTRICTIVE FLEXURAL-MODE ELECTROMECHANICAL TRANSDUCER
Ralph S. Woollett, New London, Conn., assignor to the United States of America as represented by the Secretary of the Navy
Filed May 27, 1960, Ser. No. 32,491
6 Claims. (Cl. 340—11)
(Granted under Title 35, U.S. Code (1952), sec. 266)

The invention described herein may be manufactured and used by or for the Government of the United States of America for governmental purposes without the payment of any royalties thereon or therefor.

This invention relates to an improved magnetostrictive transducer wherein alternating electrical currents may be converted into mechanical vibrations and wherein mechanical vibrations may be converted into alternating electrical voltages.

When a magnetic field courses through a magnetic material which manifests the magnetostrictive effect, any change in the magnetic field is accompanied by a stress change and a proportional dimensional change, and conversely a stress or dimensional change is accompanied by a corresponding change in magnetic characteristics of the material. Pure nickel, nickel-cobalt alloys, iron-nickel alloys, and iron-cobalt alloys are well known examples of materials that manifest relatively pronounced magnetostrictive effects. To illustrate the order of magnitude of magnetostriction, a body of pure nickel manifests a change in dimension in the direction of a changing magnetic field therethrough on the order of two parts per ten million for each one gauss change in flux density in an average field of 100 gauss; the change in dimension and the change in flux density are opposite in sign. Nickel cobalt alloys having up to 4% cobalt have approximately the same magnetostrictive characteristics as does pure nickel. Iron-nickel alloys having approximately 35 to 50 percent nickel, and iron-cobalt alloys having approximately 20 to 70 percent cobalt manifest the same order of magnetostriction under comparable flux density but in these materials, change in flux density and change in dimension are of the same sign.

Heretofore, there has not been available a satisfactory compact electromechanical transducer, particularly of the magnetostrictive type capable of radiating high intensity sonic energy, on the order of one watt per square centimeter of radiating surface, into a fluid medium under pressures as high as several thousand pounds per square inch in the lower part of the audio frequency range, at least as low as 200 cycles. The need has become very urgent for such a transducer for modern sonar systems, especially in view of the fact that submersibles that utilize such transducers are being constructed for descent to ever increasing great depth.

At lower audio frequencies vibration amplitude needs to be fairly large on the order of a substantial number of thousandths of an inch, to reach powers on the order of one watt per square centimeter of radiating surface. A magnetostrictive body, to be capable of vibrating with an amplitude of several thousandths of an inch along a lineal dimension, must measure a considerable number of feet along that lineal dimension. However, it is desirable and advantageous for a transducer to be as small as is practical. This invention is directed to a transducer that is relatively compact relative to its power capicity.

In use, under the high pressures contemplated, transducer stresses are very high when high intensity power, upwards of one watt per square centimeter, is indicated. This invention is directed to a transducer that is sturdy and durable under the described operating conditions.

An object of this invention is to provide an electromechanical transducer capable of generating high intensity sonic power in the lower part of the audio frequency band and of radiating this power as sonic waves into a high pressure fluid medium such as sea water to which it is exposed.

A further object is to convert electrical power into low frequency, high power sonic energy and radiate the sonic energy into fluids under high pressures, and to accomplish this at a fairly high coefficient of electromechanical coupling.

A further object is to provide a compact, sturdy, durable comparatively light-weight high power transducer capable of radiating high intensity low frequency sonic energy into fluid media under high pressure.

A further object is to provide an electromechanical transducer capable of radiating sonic energy in the lower audio frequency band, namely 200 cycles per second and below, and at a source intensity on the order of one watt per square centimeter of source radiating area, into fluids under pressures as high as several thousand pounds per square inch, and capable of efficiently inverting intercepted sonic wave energy into electrical energy of substantially the same waveform.

A further object is to provide an electromechanical transducer which is relatively simple, practical, compact, convenient, efficient, of high power and long range, inexpensive, and highly durable.

Other objects and many of the attendant advantages of this invention will be readily appreciated as the same becomes better understood by reference to the following detailed description when considered in connection with the accompanying drawings wherein:

FIG. 9a is an end view in elevation of the transducer core only of the embodiment shown in FIG. 9.

In its broader aspects, this invention combines magnetostrictive elements for operation in a flexural mode. Two rigid elements, one or both of which are of magnetostrictive material, and that are relatively long compared to their transverse dimensions are rigidly joined together alongside one another. A magnetic field is created in one or both of the elements to cause the ratio of their lengths to be altered by the magnetic field to cause the joined elements to undergo flexural distortion as do thermostatic bimetallic strips during temperature change. By this arrangement, the comparatively small amplitude of dimensional change longitudinally along an individual magnetostrictive element caused by flux density change in the element is amplified through flexure. Thus, large amplitude output is obtainable from a compact magnetostrictive transducer. Two similar flexural units are joined together at respective ends for disposition alongside each other and somewhat spaced apart transversely for bowing flexure together toward and away from each other, under the influence of pulsating magnetic flux created in the elements, and with minimum constraint against flexure at their joined together ends. In other words, each flexural unit operates as a support for the other flexural unit whereby constraint against flexure is minimum. The combination is characterized by a high electromechanical coupling coefficient. Also, this invention allows one to design for a higher characteristic mechanical impedance without sacrifice of electromechanical coupling coefficient.

Figure 1:
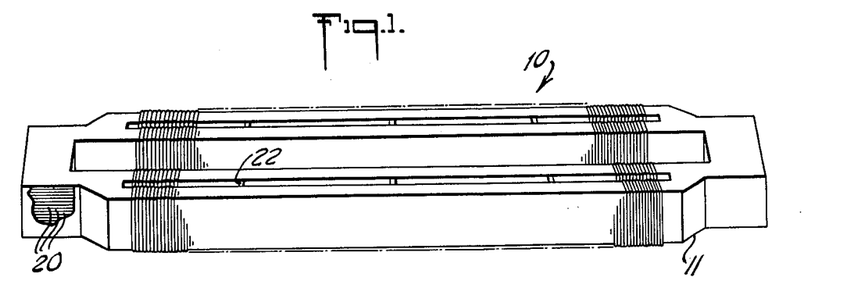
FIG. 1 is a perspective view of an embodiment of an elongated, double, flexural, magnetostrictive transducer in accordance with this invention, wherein the coils are illustrated in part.
Figure 2:
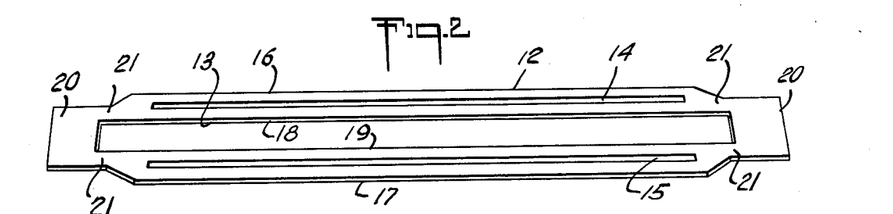
FIG. 2 is a perspective view of one of a stack of integral laminations or stampings forming the core of the transducer in FIG. 1.

With particular reference to the embodiment shown in FIG. 1, the magnetostrictive transducer 10 includes an approximately rectangular core 11 of any of the well known materials having pronounced positive or negative magnetostrictive characteristics. The core 11 preferably is formed of a stack of insulated laminae 12 of the magnetostrictive material to reduce eddy current loss in the core. One of the laminae is shown in FIG. 2. Each lamina 12 is stamped from sheet material and is formed with an air space or central slot 13 and slots 14 and 15 to each side of slot 13. The three slots define four longitudinal parallel bars 16, 17, 18, 19 that are coextensive and of equal width. The ends of the bars are bridged by generally U-shaped terminations 20 at their opposed ends. The terminations include necked down sections 21. Each lamina 12 is annealed and then electrically insulated with a film of an insulating plastic, e.g., an epoxy, not shown, that is relatively stiff and hard when cured, to approximate as closely as possible the stiffness and hardness of the lamina material. A discussion on and description of epoxy resins is included in Modern Plastics Encyclopedia of 1959 published by Breskin Publication Corp., New York, New York. The insulated laminae are stacked to a core thickness that is a fraction of the length of the bars 16, 17, 18, 19 and consolidated with the same or a similar-propertied plastic. A plurality of narrow, tightly fitting, rigid, non-magnetic stiffener members 22 (FIG. 3) are cemented in spaced apart relation in each of the slots 14 and 15 and extend transversely across the slots to stiffen the two flexure halves of the transducer.

Figure 3:
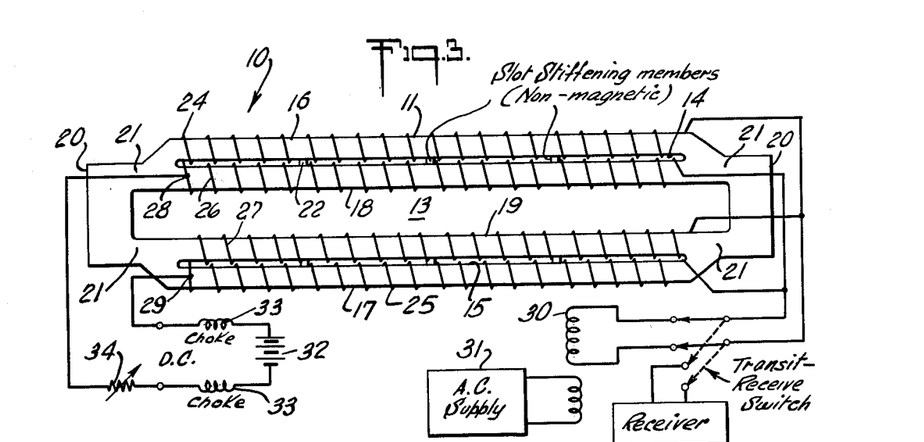
FIG. 3 is a combined schematic and mechanical illustration in plan of the magnetostrictive transducer shown in FIG. 1 electrically connected to alternating current and direct current power supplies, plus a receiver.

The outer bars 16 and 17 are substantially identically wound with insulated conductors 24 and 25 and the inner bars 18 and 19 are substantially identically wound with insulated conductors 26 and 27 respectively. The slots 14 and 15 then are filled with the same or a similar propertied stiff plastic, e.g., an epoxy, not shown. During the course of the fabrication and assembly sequence, the plastic is cured when most practical and most convenient. The left-hand ends of conductor coils 24 and 26 as seen in FIG. 3 are connected in common through conductor 28 integral therewith and the left-hand ends of connector coils 25 and 27 are connected in common through conductor 29. The right-hand ends of coils 24 and 26 that are wound about bars 16 and 18 and the right-hand ends of coils 25 and 27 that are wound about bar 17 and 19 are connected to a transmit-receive switch for connecting the coils either to a received signal amplifier or to a coupling transformer 30 of an alternating current power supply 31, with controls, not shown, for amplitude and frequency selection. A direct current power supply 32, two alternating current blocking choke coils 33, and a current controlling variable resistor 34, in series, are connected between conductors 28 and 29. The choke coils 33 may be omitted if the coils 24, 25, 26, and 27 are well balanced and the alternating current source 30, 31 is balanced with respect to ground.

Figure 4:
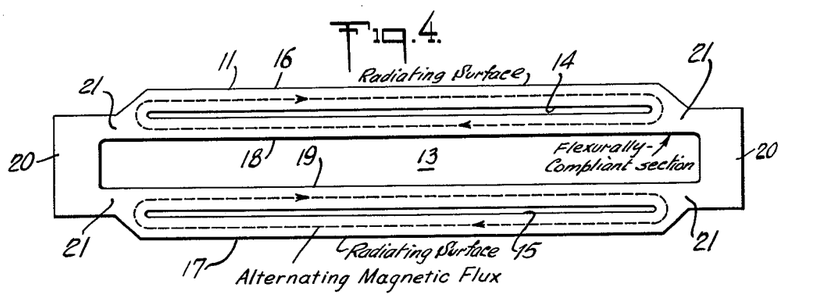
FIGS. 4 and 5 are plan views of the magnetic core of FIG. 3 and illustrate in broken lines the relationship of the alternating and direct magnetic flux paths respectively produced in the magnetic core of the transducer of FIG. 3 by the coils and power supplies shown in FIG. 2.
Figure 5:
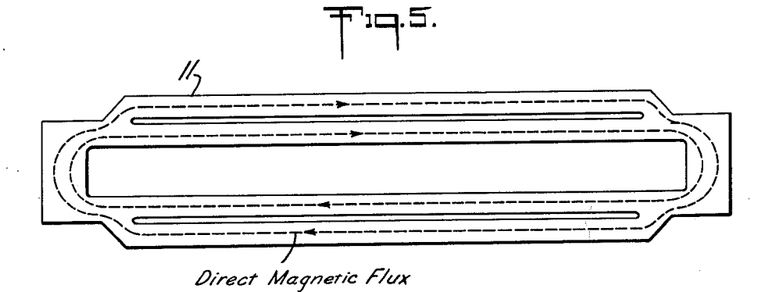

In FIG. 4, there is shown the directions of alternating magnetic flux in the legs of the core caused by one-half cycle of alternating current through the coils. The flux directions shown are reversed during the succeeding half cycle of the alternating current. The flux directions reverse when the alternating current passes through zero and reverses. In FIG. 5, there is shown the direction of direct magnetic flux through the bars caused by the direct current through the coils. It may be seen from an inspection of FIGS. 4 and 5 that during one half cycle of the alternating current, the direct magnetic flux component of the total flux and the alternating magnetic flux component of the total flux are additive in the outer bars 16 and 17 and are subtractive in the inner bars 18 and 19, and that during the opposite half cycle of the alternating current, the direct magnetic flux and the alternating magnetic flux components are subtractive in the outer bars 16 and 17 and are additive in the inner bars 18 and 19. The direct current level is selected to provide an operating point yielding the best magnetostrictive effect and is not less than the amplitude of the alternating current where the frequency of vibration is to be the same as the frequency of the alternating current.

The bars 16 and 18 flex or bow together as a unit and the bars 17 and 19 flex or bow together as a unit but in the opposite direction when the transducer is energized with the alternating and direct currents. Flexure occurs because the strains produced magnetostrictively in the bars 16, 18 are of opposite sign and the strains produced magnetostrictively in the bars 17 and 19 are of opposite sign. In other words, when the outer bars 16 and 17 expand longitudinally, the inner bars 18 and 19 contract longitudinally and conversely when the outer bars 16 and 17 contract longitudinally, the inner bars 18 and 19 expand longitudinally. The resultant effect on the core is to cause the pair of bars 16 and 18 and the pair of bars 17 and 19 to bow alternately toward and away from each other at the frequency of the alternating driving current. The outer surfaces, that is, the uppermost and lowermost surfaces of the transducer as illustrated in FIG. 4, are the sonic radiation and detection surfaces. The necked down sectors 21 in the terminations 20 that bridge the ends of the bars 16, 17, 18 and 19 offer reduced constraint to flexure of the bars. The electromechanical coupling coefficient is improved as the constraint against flexure is reduced. An intermediate part of each of the necked down sectors is, in effect, a velocity node during the vibratory movement of the bars. The effective length of each flexure pair of bars is somewhat longer than the bars themselves, extending, in effect, from velocity node to velocity node. As a practical matter, a good approximation of the length is the distance between the velocity nodes which are in the centers approximately of the necked down sectors 21. The lower limit of the cross section area of the necked down parts 21 is dictated by the maximum flux density therein, strength in shear, stiffness necessary for velocity node. The cross section should be large enough to preclude magnetic saturation in the necked down sectors 21.

The opposite ends of the transducer core 11, more specifically, the bight portions of the U-shaped bridging terminations 20, serve not only to join the two flexural units of the transducer and to support velocity nodes therefor but also provide part of the direct flux circuit as shown in FIG. 5. Therefore, they must have sufficient cross section area to accommodate the flux without saturation. It is possible to form the core 11 by joining together two flexural pairs of bars with non integrel end bridging terminations and at reduced cost, but the increased magnetic reluctance at the junctions will necessitate higher direct current to maintain the desired direct flux and the core will not be as sturdy and as durable as the core shown in FIG. 1.

If the coils on the outer bars 16 and 17 are designed differently from the coils on inner bars 18 and 19 and/or if the inner and outer bars are made with different cross sectional area, the flexure amplitudes inwardly and outwardly will be unequal. This may be done intentionally to introduce compensation for distortion or to achieve particular operational characteristics. The alternating current source 31 may be replaced by a pulsating current source for some applications. The alternating current and direct current power supplies in FIG. 3 may be interchanged. This results in an interchange of the alternating and direct flux paths shown in FIGS. 3 and 4. Measurements showed only slight difference in the electromechanical coupling coefficient when the two alternative arrangements were compared. Also, instead of the series-parallel arrangement of the four coils in FIG. 3, as seen from the A.C. terminals, an all-series or an all-parallel arrangement may be substituted, without changing the direct current connections. Also, where the alternating current and the direct current is passed through the same coils in the circuit arrangement shown in FIG. 3, separate coils may be employed for the direct current; one direct current coil may be wound about one flexural pair of bars unit and another direct current coil may be wound about the other flexural pair of bars of the transducer.

Resonant frequency measurements made on a specimen of the embodiment shown in FIG. 1 have shown that the vibrational mode of a bar with simply supported ends is closely approached by each flexural half of the transducer of FIG. 1.

Figure 7:
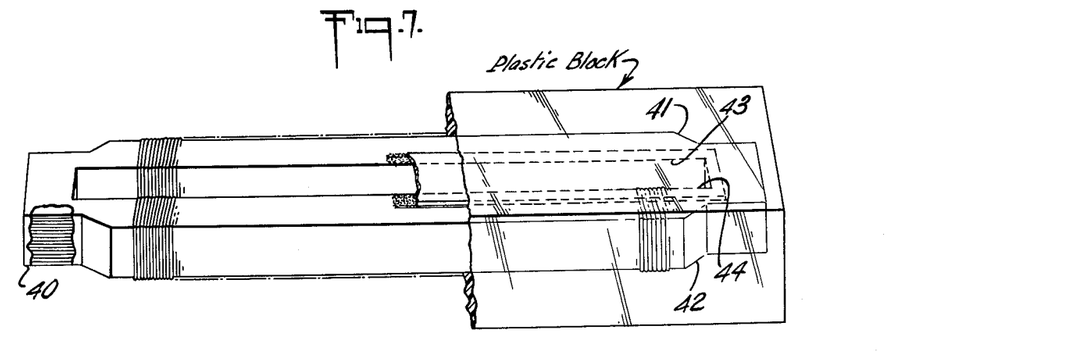
FIG. 7 is a perspective view of a transducer in accordance with this invention, potted for underwater use, the potting material being partly broken away.

For underwater applications, the transducer 10 is embedded in a plastic material that is waterproof, tough, and flexible when cured. A material having these properties and suitable for the purpose is polyurethane. The use of polyurethane in this manner is described in an Electronic Equipment of July 1956 and written by Markay H. Malootian of the U.S. Navy Underwater Sound article entitled Polyurethane Potting Resins published in Laboratory. To minimize the mechanical impedance to flexure, the air space or central slot 13 is kept free of the embedding material. This is accomplished by cementing a plate over each side of the transducer with polyurethane as shown in FIG. 7 and then embedding the combination in polyurethane. Because the side plates are cemented with polyurethane, the loading effect of the side plates on the two flexing halves of the transducer is minimal.

Figure 8:
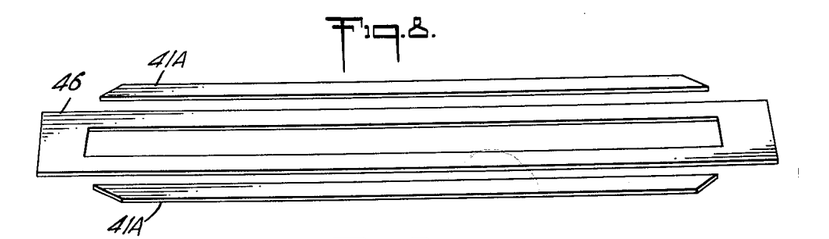
FIG. 8 shows in perspective stampings for use in forming the core of the transducer shown in FIGS. 6 and 6a, FIG. 9 is a combined schematic and mechanical illustration in plan which shows another modification of the transducer shown in FIG. 3 wherein the flexural parts of the transducer core include magnetostrictive material and non-magnetostrictive material.

FIGS. 6, 6a, 7 and 8 show a modification having a core 40 of two magnetostrictive materials. The outer bars 41 and 42 and the inner bars 43 and 44 are formed of materials that manifest magnetostrictive effects of opposite sign. Stampings 41A and 46 for forming the core 40 are shown in FIG. 8. The stampings 41A and 46 are coated with an insulating film of plastic, e.g., an epoxy, consolidated into three stacks, two of stampings 41A and one of stampings 46, and then the three consolidated stacks are cemented together as in FIG. 6; the plastic used preferably is rigid and hard, to approximate the comparable properties of the core materials as described in the embodiment in FIG. 1. While simpler to fabricate than the transducer in FIG. 1 because no winding slots are needed and because a single winding over bars 41 and 43 and over bars 42 and 44 can excite flexure, the electromechanical coupling coefficient is substantially lower than that of the embodiment in FIG. 1 and also is less rugged.

Figures 6, 6A:
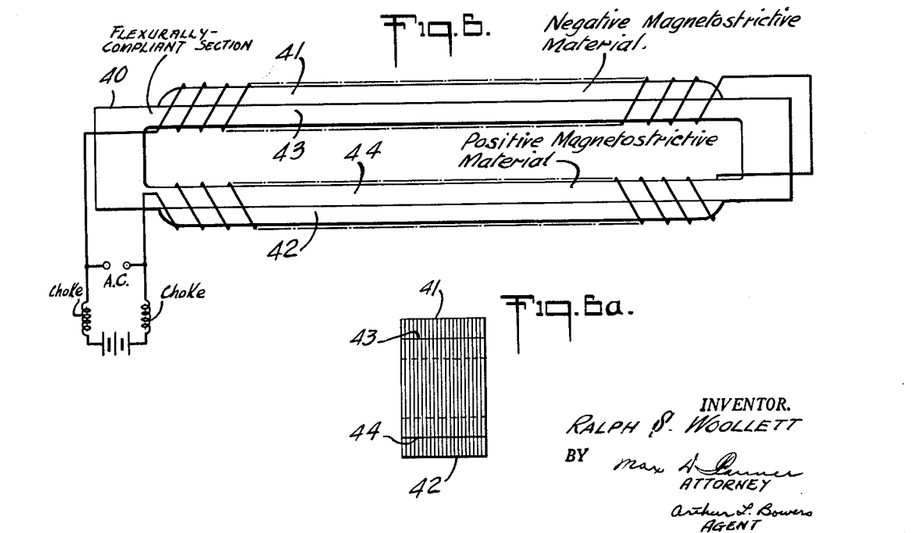
FIG. 6 is a combined schematic and mechanical illustration in plan which shows a modification of the transducer shown in FIG. 3, wherein the flexural parts of the transducer core include negative magnetostrictive material and positive magnetostrictive material.
FIG. 6a is an end view in elevation of the transducer core only of the embodiment shown in FIG. 6.
Figures 9, 9A:
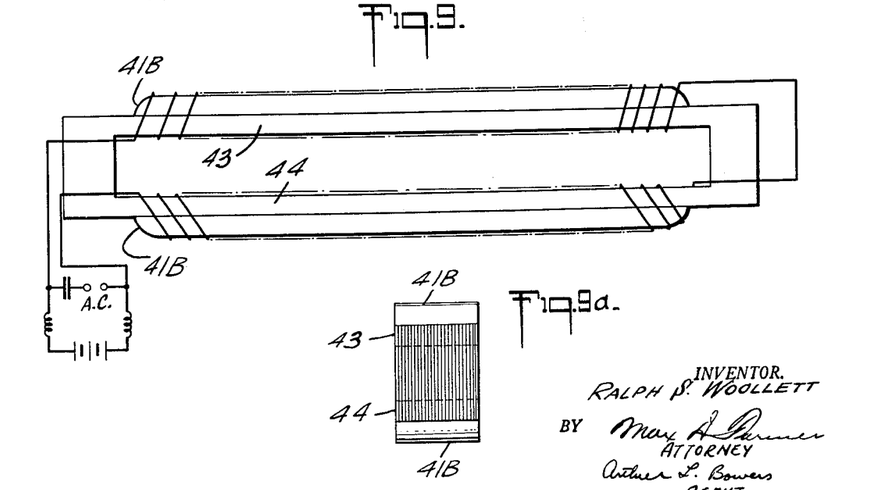

The modification shown in FIG. 9 is similar to the transducer shown in FIG. 6 except that the outer legs 41B are of non-magnetostrictive material, and need not be laminated if the material is a non conductor like glass or ceramic. Alternatively, the legs 41B may be cemented to inner sides of the legs 43 and 44. This modification of FIG. 9, compared to the embodiment in FIG. 3 has the advantage of lower cost but on the other hand the vibration amplitude and the electromechanical coupling efficiency is lower and is less rugged.

Figure 10:
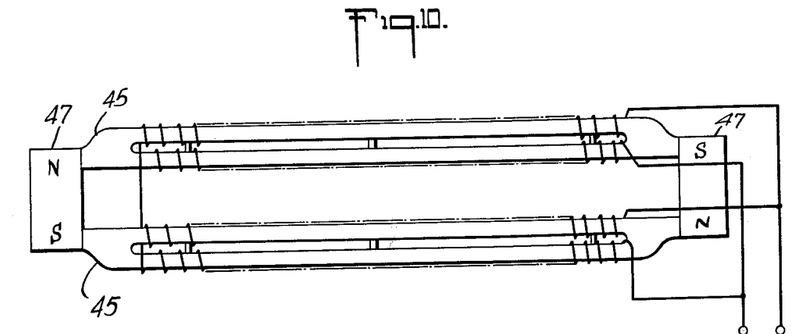
FIG. 10 is a combined schematic and mechanical illustration in plan which shows another modification of the transducer shown in FIG. 3 where the direct magnetic flux is provided by permanent magnets that comprise the end parts of the magnetic core.
Figure 11:
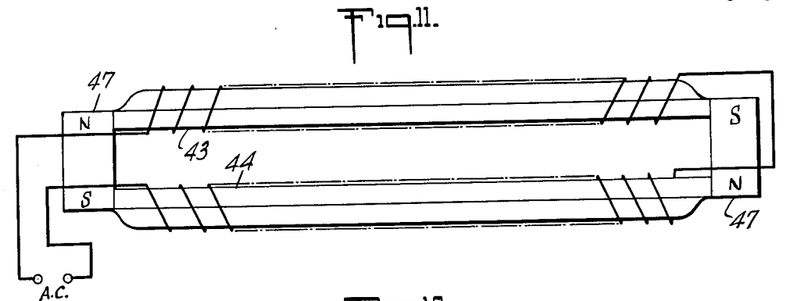
FIG. 11 is a combined schematic and mechanical illustration in plan which shows another modification of the transducer shown in FIG. 3 wherein the direct magnetic flux is provided by permanent magnets that comprise the end parts of the magnetic core and wherein the flexural parts include two materials of different magnetostrictive properties.

In FIGS. 10 and 11, direct flux is provided by one or more laminated permanent magnets 47 cemented in and forming part of the core. These modifications are producible at lower cost but are less sturdy than the embodiments in FIGS. 3, 6 and 9.

Figure 12:
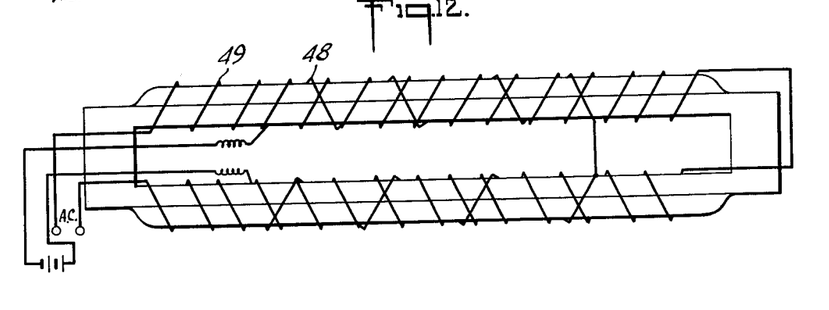
FIG. 12 is a combined schematic and mechanical illustration in plan which shows another modification of the transducer shown in FIG. 3 wherein the flexural parts of the core include two materials of different magnetostrictive properties and including separate coils and power supplies for providing the direct flux and the alternating flux respectively.

FIG. 12 illustrates a modification of the embodiments shown in FIGS. 6 and 9, the only difference being that electrically separate windings 48 and 49 are provided for the direct and alternating flux respectively. This circuit arrangement, though somewhat more expensive, isolates the power supplies and provides for greater operational flexibility.

Figures 13, 13A:
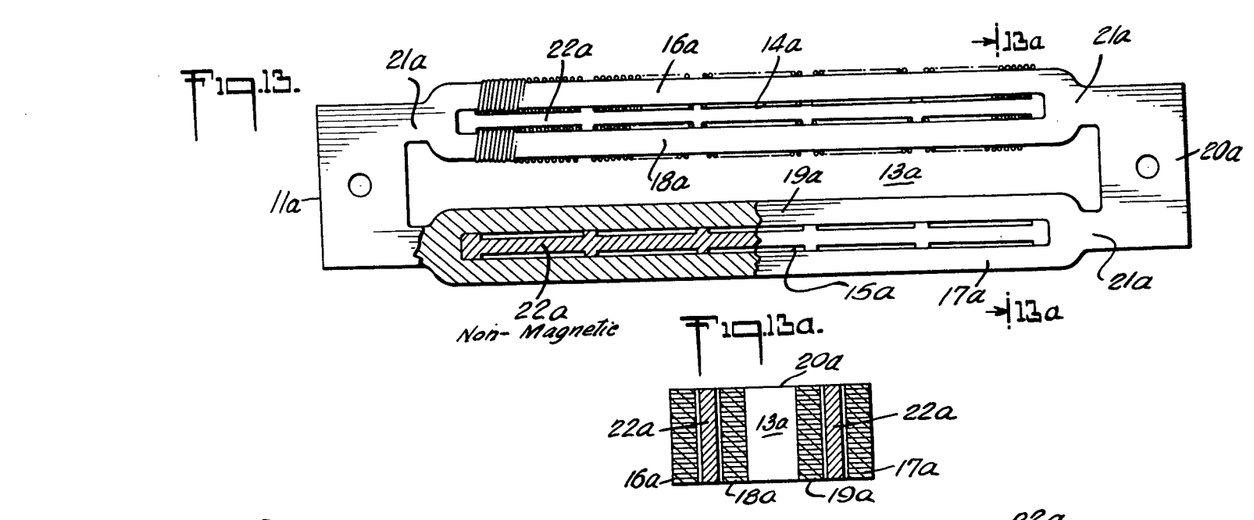
FIG. 13 shows another embodiment of the invention, partly in elevation and partly in section and showing only a fraction of the coil winding and wherein a non-magnetic stiff material is included in each flexural part of the core.
FIG. 13a is a section taken through line 13a—13a of FIG. 13 and showing the core but omitting the coils.
Figure 14:
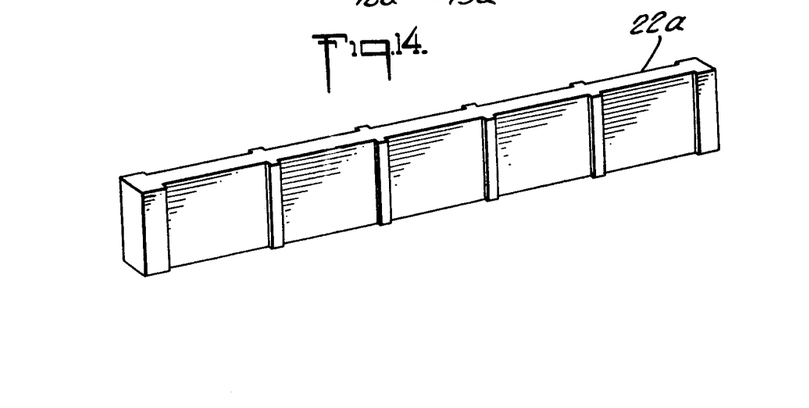
FIG. 14 shows a non-magnetic stiffener included in the core of each flexural part of the transducer bar in FIG. 13.

The embodiment shown in FIG. 13 is similar to that shown in FIG. 1. It includes a core 11a having four parallel bars 16a, 17a, 18a, 19a, separated by slots 13a, 14a and 15a. The bars are joined by generally U-shaped bridging terminations 20a. Instead of a plurality of narrow slot stiffening members 22 used in the embodiment of FIG. 1, one slot stiffening member 22a shown in FIG. 14 is cemented in place in each of the slots 14a and 15a. The stiffening members are of a non magnetic material such as aluminum. The length and thickness of the stiffening members are generally the same as the length and thickness of the slots 14a and 15a. Transverse recesses are formed along each major face of the stiffening members for seating the conductor windings. In this embodiment the slots 14a and 15a are made wider than in the embodiment shown in FIG. 1 to obtain the advantage of less flux leakage across the slot between the bars of each flexure pair and more flux through the parts of the bars experiencing the greatest strain. The sectors 21a in this embodiment are necked down on both sides because of the greater width of each flexure pair of bars as compared to the pairs of bars in FIG. 1. Winding details and circuit details are omitted, being the same as any of those described previously. The core is laminated and may in an alternate form be fabricated with magnetic bridging terminations as illustrated in FIG. 10.

Figure 15:
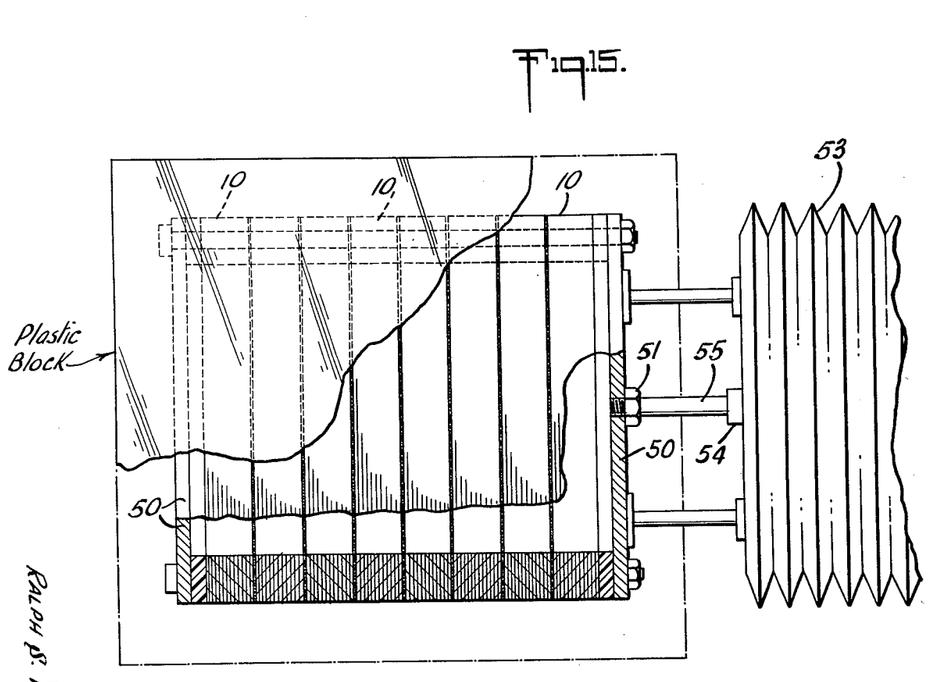
FIG. 15 shows partly in elevation and partly in section, an assembled stack of any of the foregoing transducers potted for underwater use and including pressure compensation means.

There is shown in FIG. 15 an assembly of a stack of transducers 10 of any of the types described above. Wires are omitted to simplify the illustration; they may be connected in parallel. The spacing between transducers 10 preferably is no greater than enough to provide adequate insulation between adjoining windings. Successive transducers 10 are cemented with a waterproof, tough, and flexible plastic such as polyurethane. End plates or caps 50 for sealing the air space 13 are similarly cemented to the ends of the stacked transducers. Bolts threaded through the bolt holes of the transducers 10, shown only in FIG. 13, for simplicity, are used to reinforce the assembly. One end plate is formed with aperture fitting 51 for passage of air. An air bag or bellows 53 having an aperture fitting 54 for passage of air is supported on the end plate 50 having the fitting 51. An air tube 55 joined to the two fittings 51 and 54 provides for air transfer between the interior 13 of the transducer stack and the air bag 53. Initially the pressure within may be made somewhat higher than atmospheric, e.g., 100–200 pounds per square inch. As the ambient pressure rises over the initial pressure in the transducer, the bag 53 is compressed to compensate. With this design the cement between transducers and between transducer and end cap 50 does not have to withstand excessive pressure. Another advantage of precompression is that a smaller and thus more practical volume of air may be utilized for automatic pressure compensation. For use in up to about 400 feet of water, pressure compensation may be omitted.

In a large transducer made up of a grouping of smaller units as described, radiation resistance is higher; in other words the power increase is greater than expected by just multiplying the power output of one unit by the number of units.

*Major design considerations*

The dimensions of the flexural bar resonators and of the overall transducer are determined primarily by three transducer performance parameters: resonant fequency $f_r$, mechanical storage factor $Q_M$, and power capacity. As with any electromechanical transducer, high efficiency projection is obtained only at frequencies close to the resonant frequency. The resonant frequency of the transducer in air is given by the formula:

$$f_{ra} = .45 \frac{h}{l^2} c_b \text{ cycles per second} \quad (1)$$

where $h$ = thickness of flexural bar resonator in direction of motion in meters
$l$ = length of bar in meters
$c_b$ = sound velocity in the bar material in meters/sec.

By varying both $h$ and $l$, bars of widely differing sizes may be made to have the same resonant frequency. However, to obtain high power and low $Q_M$ it is necessary to have a substantial ratio of thickness to length, $h/l$. On the other hand, if the ratio $h/l$ is too large the bar will no longer vibrate in the simple bending mode. A typical value of $h/l$ for a high power transducer is .13. Once the value of this ratio is chosen, the values of $h$ and $l$ to give the desired resonant frequency are determined and are found from Equation 1.

The resonant frequency with the transducer in water will be lower than that given by Equation 1 because of the added mass of the water. For a thin and narrow bar the resonant frequency in water may be less than half the resonant frequency in air, but for thick bars forming a wide transducer, such as would be used for high power, this reduction in resonant frequency will be less than 20%.

As with any electromechanical transducer, the broadness of the resonance depends on the mechanical storage factor $Q_M$. To obtain adequate bandwidth, sonar designers frequently specify that $Q_M$ shall be no greater than 10. When $Q_M = 10$, the frequency band over which the output power is no less than half of the output power at resonance for constant current drive, is 10% of the resonant frequency. For the transducer with a square face formed from an assembly of bars side by side the mechanical storage factor is given by the formula $$Q_M = 2.72 \frac{c_b c_w}{c_w c_b} \left(\frac{f_{ra}}{f_{rw}}\right)^3 \eta_{ma}$$

where $c_b$ = density of bar material in kilograms/cu. meter
$c_w$ = density of water in kilograms/cu. meter
$c_w$ = sound velocity of water
$f_{rw}$ = resonant frequency in water
$\eta_{ma}$ = mechanoacoustical efficiency and the other symbols are the same as for Equation 1. For low $Q_M$, $f_{ra}/f_{rw}$ must be made to approach unity, and this is done by using an assembly of bars cemented together side by side with a flexible plastic and providing a square radiating face rather than a single bar and by using a large $h/l$ ratio (.13 for example).

The power that the transducer can deliver is limited primarily by two factors: the stress fatique limit of the material and magnetic saturation of the material. Both limits are raised as the amount of active material in the transducer is increased; hence, for high power one uses a large value of $h/l$ and an assembly of many bars side by side, resulting in a relatively large transducer. The static pressure differential which the bars will withstand is also increased as the $h/l$ ratio is made large; the static pressure differential is the difference between the pressure of the surrounding medium and the pressure in the air space 13 of the core.

The center slot or air space between the opposed pairs of flexural bars must be large enough so that the air stiffness does not become comparable to the bar stiffness when operating at great depths. When $h/l = .13$, as for the typical high power transducer, an air space between pairs of bars equal to $h$ will enable compensating air pressure up to about 4000 p.s.i. to be used in the air space without unduly increasing the stiffness of the transducer.

The properties which are desired in the magnetostrictive material for this application are primarily a high electromechanical coupling coefficient, high saturation flux density, and high fatigue strength (endurance limit). A magnetostrictive alloy of 4% cobalt in nickel is an example of a material with these characteristics.

In assembling a plurality of the described devices into the rectangular transducer configuration as in FIG. 15, the spacing between the devices would be only great enough to provide insulation between adjoining windings. These spaces are filled with a tough, flexible plastic, such as polyurethane, having sufficient strength so that the structure withstands a pressure differential of at least 200 pounds per square inch. One function of this plastic is to keep the mechanical coupling between resonators low, since bar-type vibrations rather than plate-type vibrations are preferred. The end caps which seal the air space of the box-like structure are separated from the bars by a thick layer of tough, flexible plastic which has low mechanical power dissipation. This layer must provide a highly compliant seal between the vibrating bars and the stationary end caps. It must have sufficient strength to withstand the full pressure differential.

The design principles outlined above were used to arrive at the design of a high power low frequency transducer as described in this application and capable of radiating 1 watt per square centimeter of radiating surface.

The one property which conveys the most information about the potential merit of a transducer is its electromechanical coupling coefficient, $k$. The physical significance of the coupling coefficient is brought out by its energy definition: when energy is stored electrically in the transducer, $k^2$ gives the fraction of input energy which appears in mechanical form, in the resulting displacement of the transducer surface. The value of electromechanical coupling coefficient achieved depends on the degree of magnetostriction in the material employed and on the success of the electrical and mechanical design in promoting high coupling between the magnetic field and the vibrational stress.

In the magnetostrictive flexural bar design shown in FIG. 1, the winding slot may be made no wider than necessary to accommodate the wire. However, the electromechanical coupling coefficient may be increased by widening the slot so as to keep the magnetic field out of the central region of the bar, where the vibrational stress is low. In FIG. 13, the wide slot is filled with a piece of non-magnetic metal, leaving only enough space to accommodate the windings.

The electromechanical coupling coefficient of each of the two magnetostrictive bars forming the embodiment shown in FIG. 13 may be obtained as follows:

$$k_{k_{33}} = \sqrt{\frac{\frac{6}{\pi^2}\frac{(h+m)^2}{h^2+m^2+mh}}{1+\frac{m^3}{h^3-m^3}\frac{S^B{}_{33}}{S_m}-\frac{8}{\pi^2}k^2{}_{33}\left[1-\frac{3}{4}\frac{(h+m)^2}{h^2+m^2+mh}\right]}} \quad (3)$$

where $h$=total thickness of bar in direction of motion
$m$=width of slot 15a occupied by stiffener 22a
$S^B{}_{33}$=reciprocal of Young's modulus of magnetostrictive material
$S_m$=reciprocal of Young's modulus of non-magnetic material and $k_{33}$ is the intrinsic electromechanical coupling coefficient of the magnetostrictive material. This equation shows that $k$ is maximum when $m/h$ is about 1/3; under that condition $k$ is about 9% higher than it is for the ultimate limit where $m=0$.

The gain in coupling coefficient afforded by the flexural bar design as in FIG. 13 over the bar design in the other embodiments is actually greater than 9%, because the leakage flux across the winding slot is reduced when the slot is made wide; this effect is not considered in the derivation of the preceding Equation 3. Another advantage of the bar design in the embodiment in FIG. 13 is that the resonant frequency may be varied somewhat from that predicted by Equation 1 by choice of materials of different density for the non-magnetic portion of the bar. Employment of a low density material like aluminum for instance will make the resonant frequency higher than that predicted by Equation 1. The resonant frequency may be brought down again by lengthening the bars slightly, and as a result an increase in the radiating area will be achieved.

Obviously many modifications and variations of the present invention are possible in the light of the above teachings. It is therefore to be understood that within the scope of the appended claims the invention may be practiced otherwise than as specifically described.

I claim:
1. A magnetostrictive transducer comprising:
 (a) a core of magnetostrictive material having two elongate parallel perforations extending therethrough defining a pair of parallel elongate coextensive bars side-by-side and integral with the core, one of the surfaces of one of said bars parallel to the other bar being part of the core surface,
 (b) conductor means coiled about each of said bars, and
 (c) nonmagnetic means within the perforation that is between the pair of bars and secured to said bars,
 (d) the other perforation being essentially free of solid matter,
 (e) whereby said pair of bars may be caused to exhibit vibratory bowing flexure as a unit by flowing currents through said conductor means to produce oppositely pulsating magnetic flux in the two bars.
2. A magnetostrictive transducer comprising:
 (a) a stack of identical oblong integral laminations of magnetostrictive material secured together,
 (b) each of said laminations having two elongated slots each paralleling respective ones of a pair of opposite sides thereof whereby the stack of laminations has an integral bar along each of opposed sides,
 (c) each of said laminations being additionally slotted to define a second bar alongside each of the side bars, and
 (d) conductor means coiled about each of said bars, and
 (e) non-magnetic means disposed between and securing each side bar and the second bar alongside.
3. A magnetostrictive transducer comprising:
 (a) a core of stacked identical integral laminations of magnetostrictive material,
 (b) said laminations being essentially oblong and having three elongate straight parallel perforations whereby each lamination has four parallel coextensive straight sided strips of equal length and wherein each lamination is continuous around said perforations,
 (c) the two outer perforations being of equal width and being a minor fraction of the width of the intermediate perforation,
 (d) whereby the core has two outer bars and two inner bars,
 (e) a conductor coiled about each of said bars,
 (f) all of said conductor coils having equal turns,
 (g) the coil directions of the conductors on each outer bar and adjacent inner bar being the same but being opposite to that on the other outer bar and its adjacent inner bar, and
 (h) two integral rigid nonmagnetic elements each occupying substantially all of the space between adjacent conductor wound outer and inner bars, and secured to the respective inner and outer bars,
 (i) the intermediate perforation being essentially free of solid material.
4. A magnetostrictive transducer comprising:
 (a) a core of stacked identical integral laminations of magnetostrictive material secured together,
 (b) said laminations being essentially oblong and having three elongate parallel perforations,
 (c) whereby each lamination has four parallel coextensive strips of equal length and the core has two outer bars and two inner bars,
 (d) a conductor coiled about each of said bars,
 (e) a nonmagnetic means between and secured to each outer bar and its adjacent inner bar,
 (f) the inner perforation being essentially free of solid material,
 (g) whereby each of the secured together pairs of bars may be caused to exhibit vibratory bowing flexure toward and away from the other pair of bars by flowing pulsating currents through the coiled conductors.
5. A magnetostrictive transducer as defined in claim 4, wherein said nonmagnetic means includes two integral aluminum elements, one for each pair of bars and occupying substantially all of the perforation space between adjacent conductor bearing bars.

6. A magnetostrictive transducer as defined in claim 5, wherein said laminations have reduced cross-section between the end of the strips and the corresponding ends of the laminations, to reduce resistance to flexure.

References Cited by the Examiner
UNITED STATES PATENTS

| | | | |
|---|---|---|---|
| 2,249,835 | 7/41 | Lakatos | 340—11 |
| 2,444,061 | 6/48 | Peek | 340—11 |
| 2,476,778 | 7/49 | Smoluchowski | 340—11 |
| 2,496,484 | 2/50 | Massa | 340—11 |
| 2,566,984 | 9/51 | Firth. | |
| 2,745,084 | 5/56 | Bundy | 340—11 |
| 2,792,674 | 5/57 | Balamuth et al. | 310—26 X |
| 2,842,689 | 7/58 | Harris | 340—11 X |
| 2,848,672 | 8/58 | Harris | 318—118 |
| 2,888,583 | 5/59 | Harris | 310—26 |
| 2,947,890 | 8/60 | Harris | 310—26 |
| 2,951,975 | 9/60 | Carlin | 318—118 |
| 3,007,063 | 10/61 | Harris | 310—26 |

CHESTER L. JUSTUS, *Primary Examiner*.

KATHLEEN CLAFFY, MILTON O. HIRSHFIELD,
*Examiners.*